United States Patent
Zubillaga et al.

[11] Patent Number: 5,820,200
[45] Date of Patent: Oct. 13, 1998

[54] RETRACTABLE MOTORCYCLE COVERING SYSTEM

[76] Inventors: Edward L. Zubillaga, 5245 Carryback Ave., San Jose, Calif. 95111; James Bumb, P.O. Box 235, Coloma, Calif. 95613

[21] Appl. No.: 704,916

[22] Filed: Aug. 30, 1996

[51] Int. Cl.$^6$ ....................................................... B60J 7/20
[52] U.S. Cl. ........................ 296/136; 296/78.1; 150/167
[58] Field of Search .................................. 296/78.1, 136; 150/167

[56] References Cited

U.S. PATENT DOCUMENTS

| | | | |
|---|---|---|---|
| 1,853,742 | 4/1932 | Owen et al. | 150/167 |
| 3,537,746 | 11/1970 | Peters | 296/78.1 |
| 3,659,872 | 5/1972 | Warner | 296/78.1 |
| 3,884,523 | 5/1975 | Allen | 296/136 |
| 4,171,145 | 10/1979 | Pearson, Sr. | 296/78.1 |
| 5,052,738 | 10/1991 | Li | 296/78.1 |
| 5,562,139 | 10/1996 | Cseri | 296/136 X |

FOREIGN PATENT DOCUMENTS

| | | | |
|---|---|---|---|
| 179997 | 3/1954 | Austria | 296/78.1 |
| 1104501 | 11/1955 | France | 296/78.1 |
| 518626 | 3/1955 | Italy | 296/78.1 |
| 614884 | 9/1961 | Italy | 296/78.1 |

*Primary Examiner*—Joseph D. Pape

[57] ABSTRACT

A retractable motorcycle covering system for protecting a motorcycle from various weather conditions every place the user operates the motorcycle without reducing storage space on the motorcycle. The inventive device includes a storage structure, a mounting bracket securing the storage structure to the front of a motorcycle, a spring coil and a shaft secured within the storage structure, and a cover sheet secured to the shaft retracting the cover sheet into the storage container.

9 Claims, 3 Drawing Sheets

RETRACTABLE MOTORCYCLE COVERING SYSTEM

BACKGROUND OF THE INVENTION

1. Field of the Invention

The present invention relates to Cover Devices and more particularly pertains to a new retractable motorcycle covering system for protecting a motorcycle from various weather conditions every place the user operates the motorcycle without reducing storage space on the motorcycle.

2. Description of the Prior Art

The use of Cover Devices is known in the prior art. More specifically, Cover Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Cover Devices include U.S. Pat. No. 4,171,145; U.S. Pat. No. 5,080,431; U.S. Design Pat. No. 334,008; U.S. Pat. No. 5,052,738; U.S. Pat. No. 4,848,386 and U.S. Pat. No. 4,356,831.

While these devices fulfill their respective, particular objectives and requirements, the aforementioned patents do not disclose a new retractable motorcycle covering system. The inventive device includes a storage structure, a mounting means securing the storage structure to the front of a motorcycle, a coiling means secured within the storage structure, and a cover sheet secured to the coiling means retracting the cover sheet into the storage container.

In these respects, the retractable motorcycle covering system according to the present invention substantially departs from the conventional concepts and designs of the prior art, and in so doing provides an apparatus primarily developed for the purpose of protecting a motorcycle from various weather conditions every place the user operates the motorcycle without reducing storage space on the motorcycle.

SUMMARY OF THE INVENTION

In view of the foregoing disadvantages inherent in the known types of Cover Devices now present in the prior art, the present invention provides a new retractable motorcycle covering system construction wherein the same can be utilized for protecting a motorcycle from various weather conditions every place the user operates the motorcycle without reducing storage space on the motorcycle.

The general purpose of the present invention, which will be described subsequently in greater detail, is to provide a new retractable motorcycle covering system apparatus and method which has many of the advantages of the Cover Devices mentioned heretofore and many novel features that result in a new retractable motorcycle covering system which is not anticipated, rendered obvious, suggested, or even implied by any of the prior art Cover Devices, either alone or in any combination thereof.

To attain this, the present invention generally comprises a storage structure, a mounting means securing the storage structure to the front of a motorcycle, a coiling means secured within the storage structure, and a cover sheet secured to the coiling means retracting the cover sheet into the storage container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable motorcycle covering system apparatus and method which has many of the advantages of the Cover Devices mentioned heretofore and many novel features that result in a new retractable motorcycle covering system which is not anticipated, rendered obvious, suggested, or even implied by any of the prior art Cover Devices, either alone or in any combination thereof.

It is another object of the present invention to provide a new retractable motorcycle covering system which may be easily and efficiently manufactured and marketed.

It is a further object of the present invention to provide a new retractable motorcycle covering system which is of a durable and reliable construction.

An even further object of the present invention is to provide a new retractable motorcycle covering system which is susceptible of a low cost of manufacture with regard to both materials and labor, and which accordingly is then susceptible of low prices of sale to the consuming public, thereby making such retractable motorcycle covering system economically available to the buying public.

Still yet another object of the present invention is to provide a new retractable motorcycle covering system which provides in the apparatuses and methods of the prior art some of the advantages thereof, while simultaneously overcoming some of the disadvantages normally associated therewith.

Still another object of the present invention is to provide a new retractable motorcycle covering system for protecting a motorcycle from various weather conditions every place the user operates the motorcycle without reducing storage space on the motorcycle.

Yet another object of the present invention is to provide a new retractable motorcycle covering system which includes a storage structure, a mounting means securing the storage structure to the front of a motorcycle, a coiling means secured within the storage structure, and a cover sheet secured to the coiling means retracting the cover sheet into the storage container.

Still yet another object of the present invention is to provide a new retractable motorcycle covering system that protects a motorcycle from the elements.

Even still another object of the present invention is to provide a new retractable motorcycle covering system that is conveniently stored within the storage structure during utilization of the motorcycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
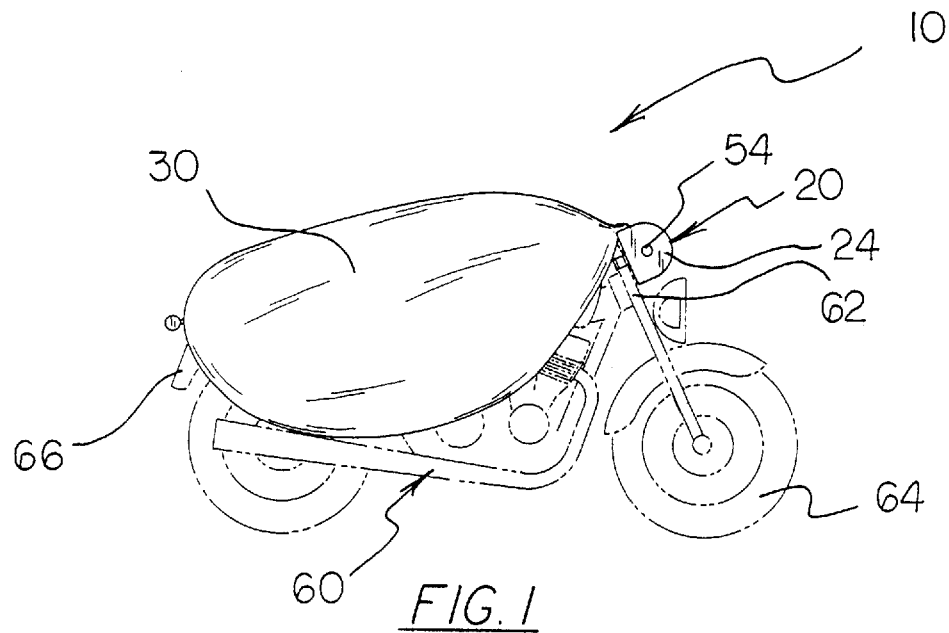
FIG. 1 is a side view of a new retractable motorcycle covering system showing the cover sheet covering the motorcycle according to the present invention.
Figure 2:
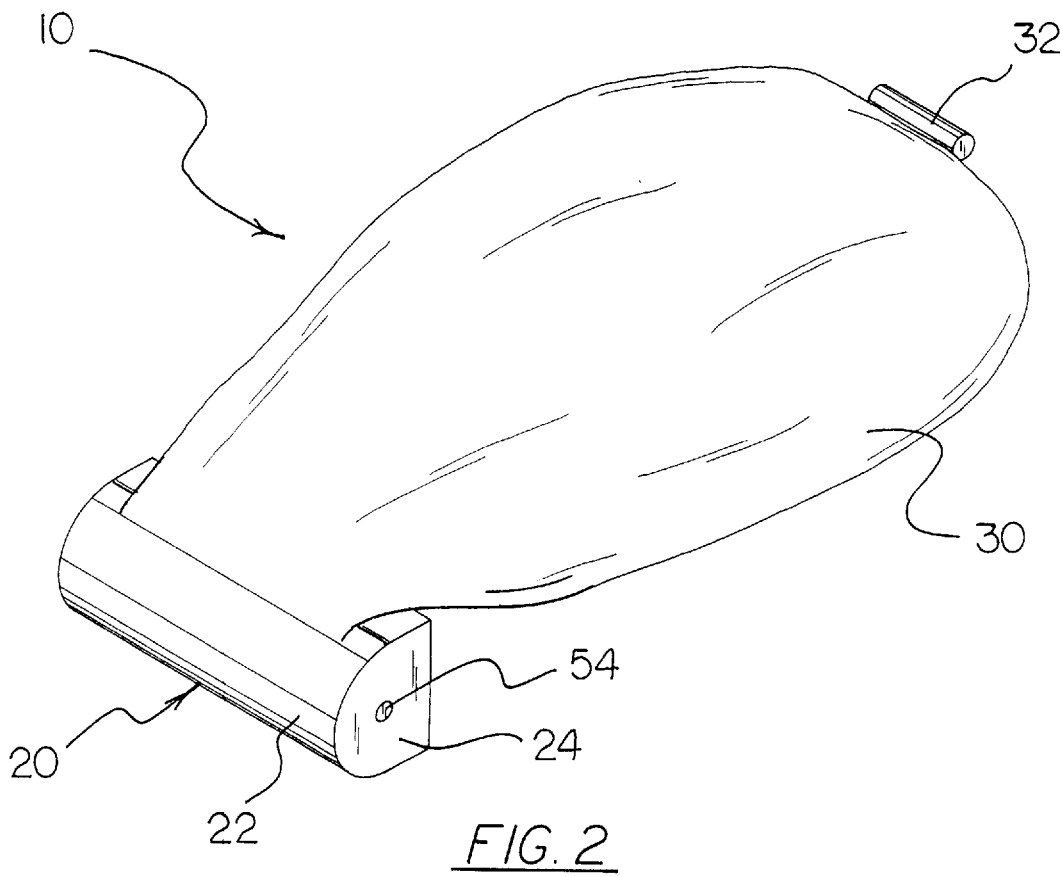
FIG. 2 is a side perspective view of the cover sheet projecting outside of the storage structure.

With reference now to the drawings, and in particular to FIGS. 1 through 6 thereof, a new retractable motorcycle covering system embodying the principles and concepts of the present invention and generally designated by the reference numeral 10 will be described.

More specifically, it will be noted that the retractable motorcycle covering system 10 comprises a storage structure 20, a mounting means 40 secured to the rear portion of the storage structure 20, a coiling means 50 secured within the storage structure 20, and a cover sheet 30 with one end secured to the coiling means 50 where the cover sheet 30 is formed to cover the middle to rear sections of a motorcycle 60.

Figure 3:
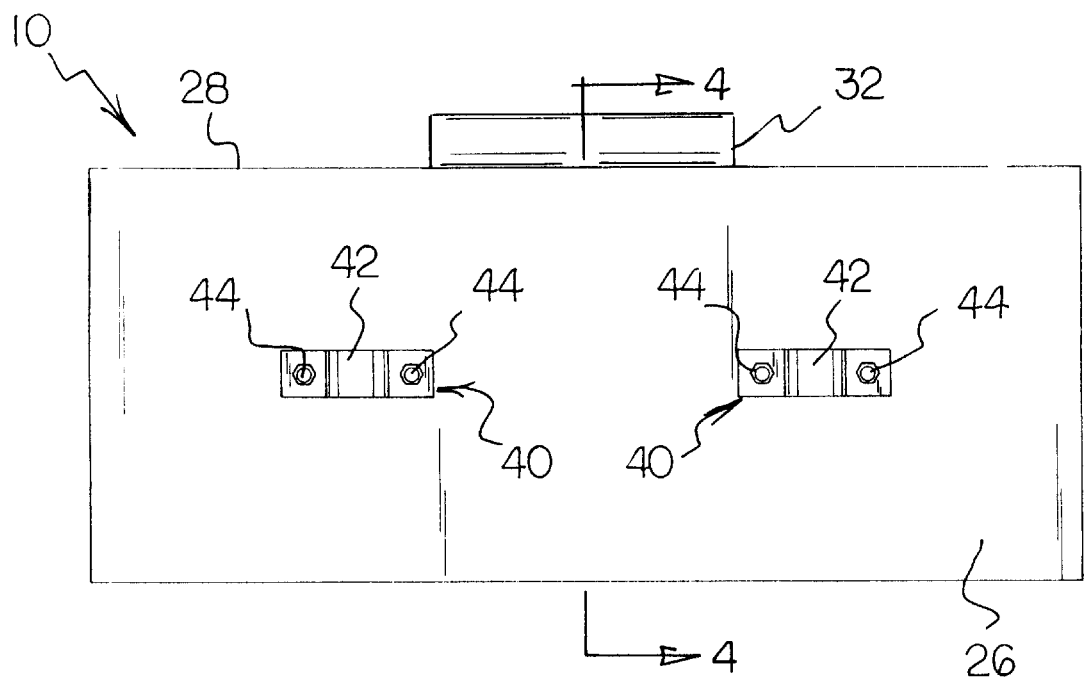
FIG. 3 is a rear view of the present invention disclosing the mounting means and the sheet passage.
Figure 4:
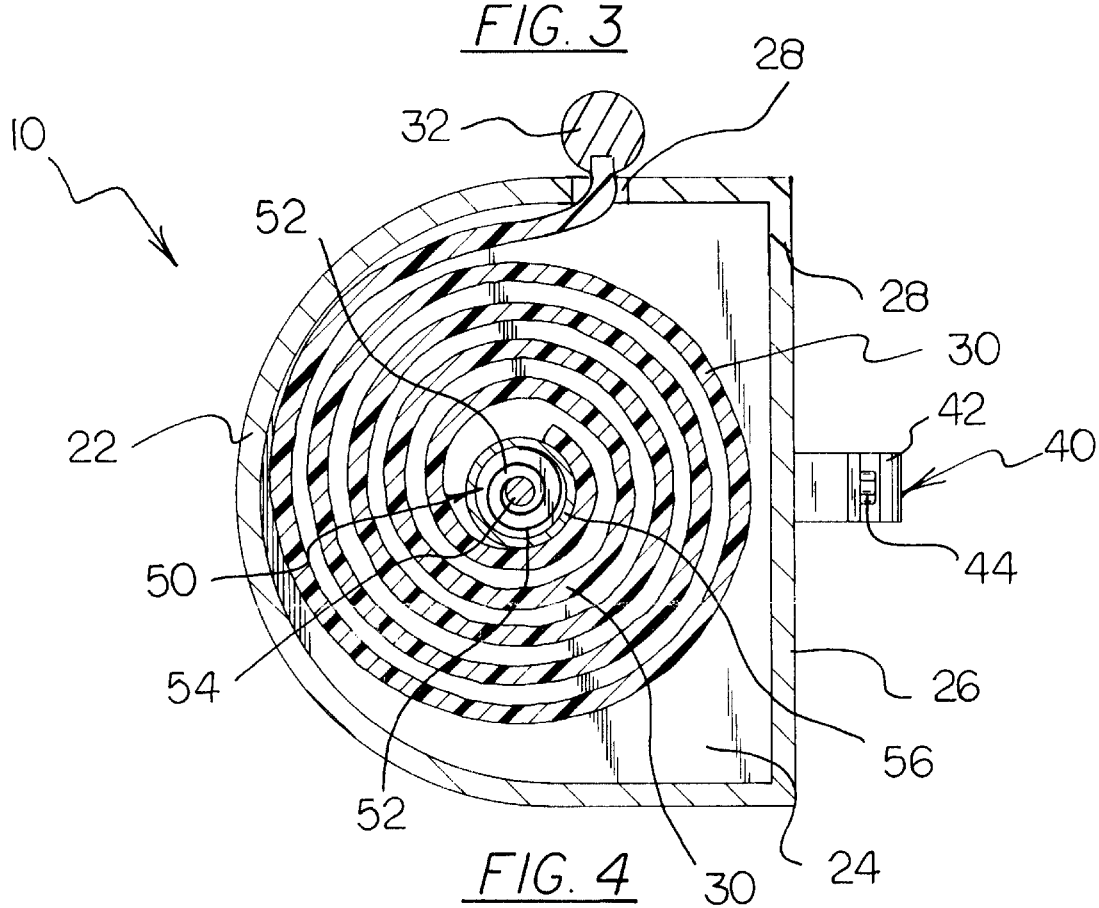
FIG. 4 is a cross sectional view taken along line 4—4 of FIG. 3 of the drawings disclosing the coiling means in relation to the cover sheet and storage structure.
Figure 5:
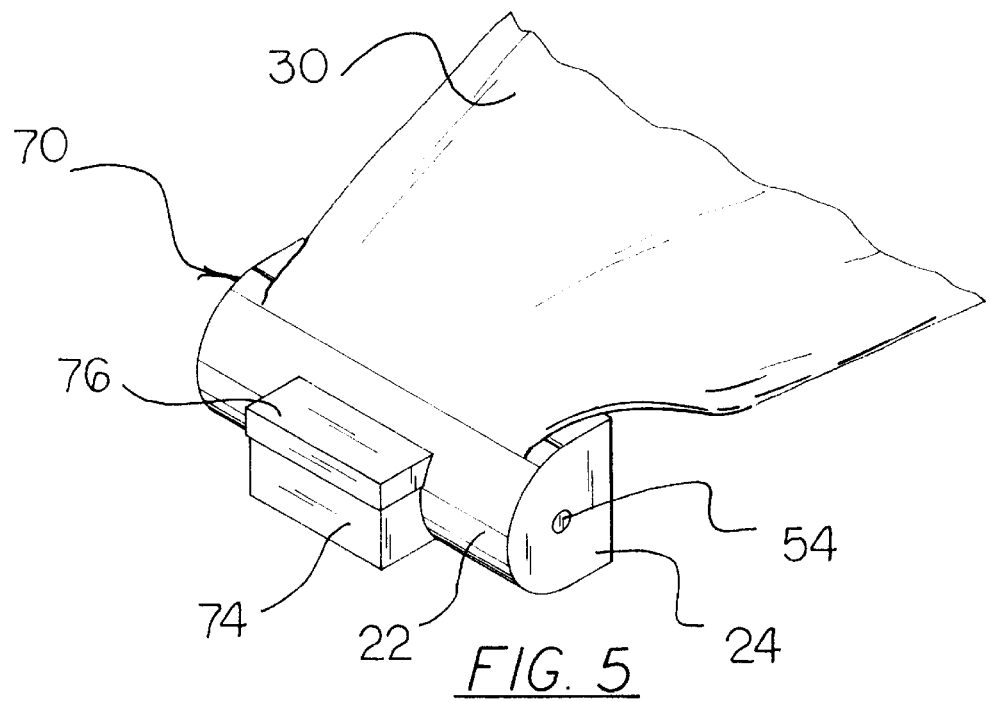
FIG. 5 is a side perspective view of an alternative embodiment of the present invention disclosing the front wheel covering means.

As best illustrated in FIGS. 1 through 6, it can be shown that the storage structure 20 includes a U-shaped member 22 at least the width of the cover sheet 30. A rear member 26 is secured to the elongated opening of the U-shaped member 22 as best shown in FIG. 3 of the drawings. A side plate 24 is secured to both ends of the U-shaped member 22. The rear member 26 includes a horizontal sheet passage 28 near the upper portion formed to allow passage of the cover sheet 30. The coiling means 50 includes a shaft 54 secured horizontally within the storage container to both side plates 24 along the longitudinal axis. A spring coil 52 has one end secured to the shaft 54 as best shown in FIG. 4 of the drawings. A coiling pipe 56 surrounds the spring coil 52 and shaft 54. The spring coil 52 is secured to the interior portion of the coiling pipe 56 and the cover sheet 30 is secured to the exterior portion thereof allowing coiling of the cover sheet 30 there upon as shown in FIG. 4 of the drawings. The cover sheet 30 projects from the coiling pipe 56 through the sheet passage 28 with the end opposite of the coiling pipe 56 securing a handle 32 and retractably extending to the rear fender 66 of the motorcycle 60. The mounting means 40 includes at least one mounting bracket 42 partially surrounding a front fork 62 with a fastener 44 securing both ends of the mounting bracket 42 to the rear member 26 of the storage structure 20 as best shown in FIG. 5 of the drawings. The cover sheet 30 and the coiling pipe 56 are removable allowing for easy replacement of the damaged cover sheet 30.

Figure 6:
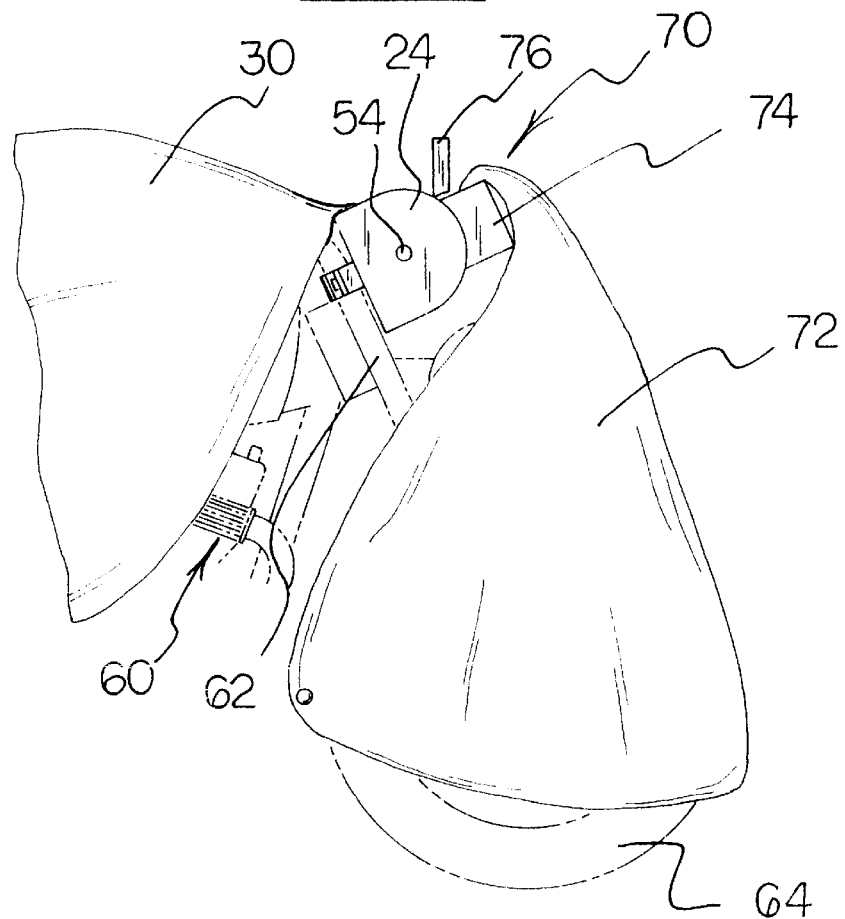
FIG. 6 is a side view of the alternative embodiment showing the cover sheet retracted from the storage structure and the front sheet cover retracted from the front container.

Alternatively as shown in FIGS. 5–6 of the drawings, a front wheel covering means 70 is secured to the front exterior portion of the U-shaped member 22. The front wheel covering means 70 includes a front container 74. A lid 76 removably engages the opening of the front container 74. A front sheet cover 72 has one end secured to the interior portion of the front container 74. The opposite end of the front sheet cover 72 is extendible over a front wheel 64 of the motorcycle 60.

In use, the user grasps the handle 32 horizontally removing the cover sheet 30 from within the storage structure 20. The user extends the cover sheet 30 over the rear fender 66 of the motorcycle 60. When the user utilizes the motorcycle 60 the user disengages the end of the cover sheet 30 securing the handle 32 from the rear fender 66 of the motorcycle 60. In the alternative embodiment, the user removes the front sheet cover 72 from within the front container 74 extending the front sheet cover 72 over the front wheel 64.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retractable motorcycle covering system comprising:
 a storage structure having a rear portion and a front portion;

a mounting means securable to the rear portion of the storage structure;

a coiling means secured within the storage structure;

a cover sheet having one end secured to the coiling means, wherein the cover sheet is formed to cover a middle to rear section of a motorcycle; and a front wheel covering means securable to the front portion of the storage structure, wherein said front wheel covering means selectively encloses a front wheel of the motorcycle.

2. The retractable motorcycle covering system of claim 1 wherein the storage structure includes:

a U-shaped member;

a rear member secured to the elongated opening of the U-shaped member;

a side plate secured to both ends of the U-shaped member; and the rear member including a horizontal sheet passage near the upper portion formed to allow passage of the cover sheet.

3. The retractable motorcycle covering system of claim 1 wherein the coiling means includes:

a shaft secured horizontally within the storage container to both side plates;

a spring coil with one end secured to the shaft; and a coiling pipe surrounding the spring coil and shaft, and where the spring coil is secured to the interior portion of the coiling pipe and the cover sheet is secured to tile exterior portion allowing coiling of the cover sheet upon.

4. The retractable motorcycle covering system of claim 3, wherein the cover sheet projects from the coiling pipe through the sheet passage with the end opposite of the coiling pipe securing a handle and retractably extending to the rear fender of the motorcycle.

5. The retractable motorcycle covering system of claim 1 wherein the mounting means includes at least one mounting bracket for engaging a pair of front forks with a fastener securing opposite ends of the mounting bracket to a rear portion of the storage structure.

6. The retractable motorcycle covering system of claim 1 wherein the front wheel covering means comprises:

a front container having an opening;

a lid removably engaging the opening of the front container; and a front sheet cover having one end secured to an interior portion of the front container where an opposite end is extendible over the front wheel of the motorcycle.

7. The retractable motorcycle covering system of claim 6, wherein said cover sheet and said coiling pipe are removable.

8. A retractable motorcycle covering system comprising:

a storage structure having a rear portion and a front portion;

a mounting means securable to the rear portion of the storage structure;

a coiling means secured within the storage structure;

a cover sheet having one end secured to the coiling means, wherein the cover sheet is formed to cover a middle to rear section of a motorcycle; and a front wheel covering means securable to the front portion of the storage structure, wherein said front wheel covering means selectively encloses a front wheel of the motorcycle;

wherein the storage structure comprises:
    a U-shaped member having an elongated opening;
    a rear member secured to the elongated opening of the U-shaped member;
    a pair of side plates secured to opposite ends of the U-shaped member thereby enclosing said U-shaped member; and
    the rear member including a horizontal sheet passage near the upper portion formed to allow passage of the cover sheet;

wherein the coiling means comprises:
    a shaft secured horizontally within the storage container to both side plates;
    a spring coil having one end secured to the shaft; and
    a coiling pipe surrounding the spring coil and the shaft, wherein the spring coil is secured to the interior portion of the coiling pipe and the cover sheet is secured to the exterior portion allowing coiling of the cover sheet thereupon;

wherein the cover sheet projects from the coiling pipe through the sheet passage with an end opposite of the coiling pipe secures a handle and retractably extends to a rear fender of the motorcycle;

wherein the mounting means includes at least one mounting bracket for engaging a pair of front forks with a fastener securing opposite ends of the mounting bracket to a rear portion of the storage structure;

wherein the front wheel covering means comprises:
    a front container having an opening;
    a lid removably engaging the opening of the front container; and
    a front sheet cover having one end secured to an interior portion of the front container where an opposite end is extendible over the front wheel of the motorcycle.

9. The retractable motorcycle covering system of claim 8, wherein the cover sheet and the coiling pipe are revocable.

* * * * *